United States Patent [19]
Kiefer et al.

[11] Patent Number: 5,888,538
[45] Date of Patent: *Mar. 30, 1999

[54] METHODS AND APPARATUS FOR MAKING SEAMLESS CAPSULES

[75] Inventors: Jesse John Kiefer, Belvidere; Blake Henderson Glenn, Madison, both of N.J.

[73] Assignee: Warner-Lambert Company, Morris Plains, N.J.

[ * ] Notice: The term of this patent shall not extend beyond the expiration date of Pat. No. 5,795,590.

[21] Appl. No.: 828,457

[22] Filed: Mar. 28, 1997

Related U.S. Application Data

[60] Continuation-in-part of Ser. No. 686,649, Jul. 24, 1996, which is a division of Ser. No. 412,672, Mar. 29, 1995, Pat. No. 5,595,757.

[51] Int. Cl.⁶ ..................................................... A61K 9/48
[52] U.S. Cl. .......................... 424/451; 424/489; 424/464; 424/461; 424/454; 264/4; 264/4.3; 264/4.4
[58] Field of Search .................................. 424/489, 451, 424/464; 428/402.2; 264/4, 14, 4.3, 4.4

[56] References Cited

U.S. PATENT DOCUMENTS

| | | |
|---|---|---|
| 2,857,281 | 10/1958 | Schultz et al. . |
| 3,971,852 | 7/1976 | Brenner et al. . |
| 4,251,195 | 2/1981 | Suzuki et al. . |
| 4,279,632 | 7/1981 | Frosch et al. . |
| 4,422,985 | 12/1983 | Morishita et al. . |
| 4,695,466 | 9/1987 | Morishita et al. . |
| 4,888,140 | 12/1989 | Schlameus et al. . |
| 5,009,900 | 4/1991 | Levine et al. . |
| 5,300,305 | 4/1994 | Stapler et al. . |
| 5,370,864 | 12/1994 | Peterson et al. . |
| 5,620,707 | 4/1997 | Sanker et al. . |

FOREIGN PATENT DOCUMENTS

| | | |
|---|---|---|
| 0339958 | 11/1989 | European Pat. Off. . |
| 0513563 | 11/1992 | European Pat. Off. . |
| 0525731 | 2/1993 | European Pat. Off. . |
| 563807 | 7/1975 | Switzerland . |
| 675370 | 9/1990 | Switzerland . |

*Primary Examiner*—Thurman K. Page
*Assistant Examiner*—William E. Benston, Jr.
*Attorney, Agent, or Firm*—Linda A. Vag

[57] ABSTRACT

Apparatus and method for the production of seamless capsules comprising a shell material encapsulating a center-filled core material in which a heated carrier liquid or air is cooled by a heat exchanger.

23 Claims, 4 Drawing Sheets

5,888,538

METHODS AND APPARATUS FOR MAKING SEAMLESS CAPSULES

RELATED APPLICATION

This is continuation-in-part application of U.S. Ser. No. 08/686,649 filed Jul. 24, 1996 allowed Feb. 18, 1998 which is a divisional application of U.S. Ser. No. 08/412,672 filed Mar. 29, 1995, now U.S. Pat. No. 5,595,757 issued Jan. 21, 1997.

BACKGROUND OF THE INVENTION

1. Field of the Invention

The present invention is related to a seamless capsule comprising a shell material encapsulating a center-filed core material, wherein the shell material is formed of a carbohydrate in glassy state, and especially to methods and apparatus for making the seamless capsules for producing food products and topically applied products employing the same.

2. Description of the Prior Art

Traditionally, seamless capsules formed of a shell material encapsulating a core material have been made by using as the shell material film-forming materials such as gelatin and gums. These shell materials present two disadvantages. First, they are formed from an aqueous solution. Consequently, when the capsules are formed, large amounts of water must be removed, requiring great amounts of energy and long drying times. Second, these shell materials dissolve slowly when the capsules are being consumed, thereby leaving a distasteful plastic film-like residue in the mouth.

Seamless capsules are usually made by simultaneously extruding the shell material and the core material through concentrically aligned nozzles such that the extruded shell material and the extruded core material exit the nozzles as a coaxial jet with the shell material surrounding the core material into a stream of cooled carrier fluid that is flowing downward. While descending in the cooled carrier fluid, the coaxial jet breaks into droplets with the shell material encapsulating the core material. The droplets then solidify in the cooled carrier fluid to form seamless capsules. Such methods are disclosed, for example, in U.S. Pat. Nos. 4,251,195 and 4,695,466. However, when the shell material is a material that solidifies quickly, this prior art method is disadvantageous in that the shell material in the coaxial jet may solidify prior to encapsulation. As a result, seamless capsules could not be formed, and any capsules that were formed were not spherical and did not have uniform size and shape.

An attempt to overcome this problem was proposed in U.S. Pat. No. 4,422,985, which describes a method that modifies the prior art method by introducing a coaxial triple jet consisting of a heated circulating liquid surrounding the shell material which in turn surrounds the core material into the cooled carrier liquid to allow encapsulation to take place. In this method, since capsule formation must still take place in the cooled carrier liquid, if any solidification of the shell material occurs prior to entering the cooled carrier liquid, encapsulation will not occur.

Other methods used for making capsules typically involve using a screw extruder to extrude an emulsion containing the shell matrix and the material to be encapsulated. However, in such a process, it is difficult to make a capsule formed of a shell material encapsulating a center-filled core material. Instead, the encapsulated material is often in the form of globules that are distributed within the matrix.

U.S. Pat. No. 2,857,281 describes a process for making a solid flavoring composition in the form of globular particles by extruding an emulsion containing a sugar base and flavor oil into droplets.

U.S. Pat. No. 3,971,852 describes a process for encapsulating oil in a cellular matrix that is formed of polyhydroxy and polysaccharide compounds. The oil is in an emulsified state with the cellular matrix, and the resulting emulsion is spray dried as droplets of the emulsion.

U.S. Pat. No. 5,009,900 discloses a process for encapsulating volatile and/or labile components with extruded glassy matrices, wherein the encapsulated material is distributed in the glassy matrices.

European Patent Application No. 0339958 discloses an antifoaming composition containing an outer shell of a meltable sugar in its crystalline state with an organopolysiloxane antifoaming composition imbedded therein. This composition is formed by melting a sugar base and dispersing the organopolysiloxane antifoaming composition in the sugar melt as the discontinuous phase. The melt is then solidified, thereby imbedding and entrapping the antifoaming composition, which is dispersed in the melt.

U.S. Pat. No. 5,300,305 relates to microcapsules that provide long lasting breath protection.

An effective means of forming seamless capsules comprising a shell material encapsulating a core material in accordance with the present invention enable the production of a wide variety of products for consumption or application to the human body.

SUMMARY OF THE INVENTION

The present invention is generally directed to methods and apparatus for the production of seamless capsules comprising a shell material made of a glassy carbohydrate encapsulating a core material comprising the steps of:

providing a concentrically aligned multiple nozzle system having at least an outer nozzle and an inner nozzle;

supplying a shell material to the outer nozzle and a core material to the inner nozzle;

simultaneously extruding the shell material through the outer nozzle and the core material through the inner nozzle, thereby forming a coaxial jet of the shell material surrounding the core material;

introducing the coaxial jet into a flow of a first carrier fluid which has been heated, thereby allowing the shell material to encapsulate the core material to form capsules in the heated carrier fluid;

introducing the capsules into a cooled carried fluid to thereby allow the capsules to solidify.

The seamless capsules can be used, for example, in the production of food products, beverages, topical compositions and the like.

BRIEF DESCRIPTION OF THE DRAWINGS

The following drawings are illustrative of embodiments of the invention and are not intended to limit the invention as encompassed by the claims forming part of the Application.

DETAILED DESCRIPTION OF THE INVENTION

Figure 1:
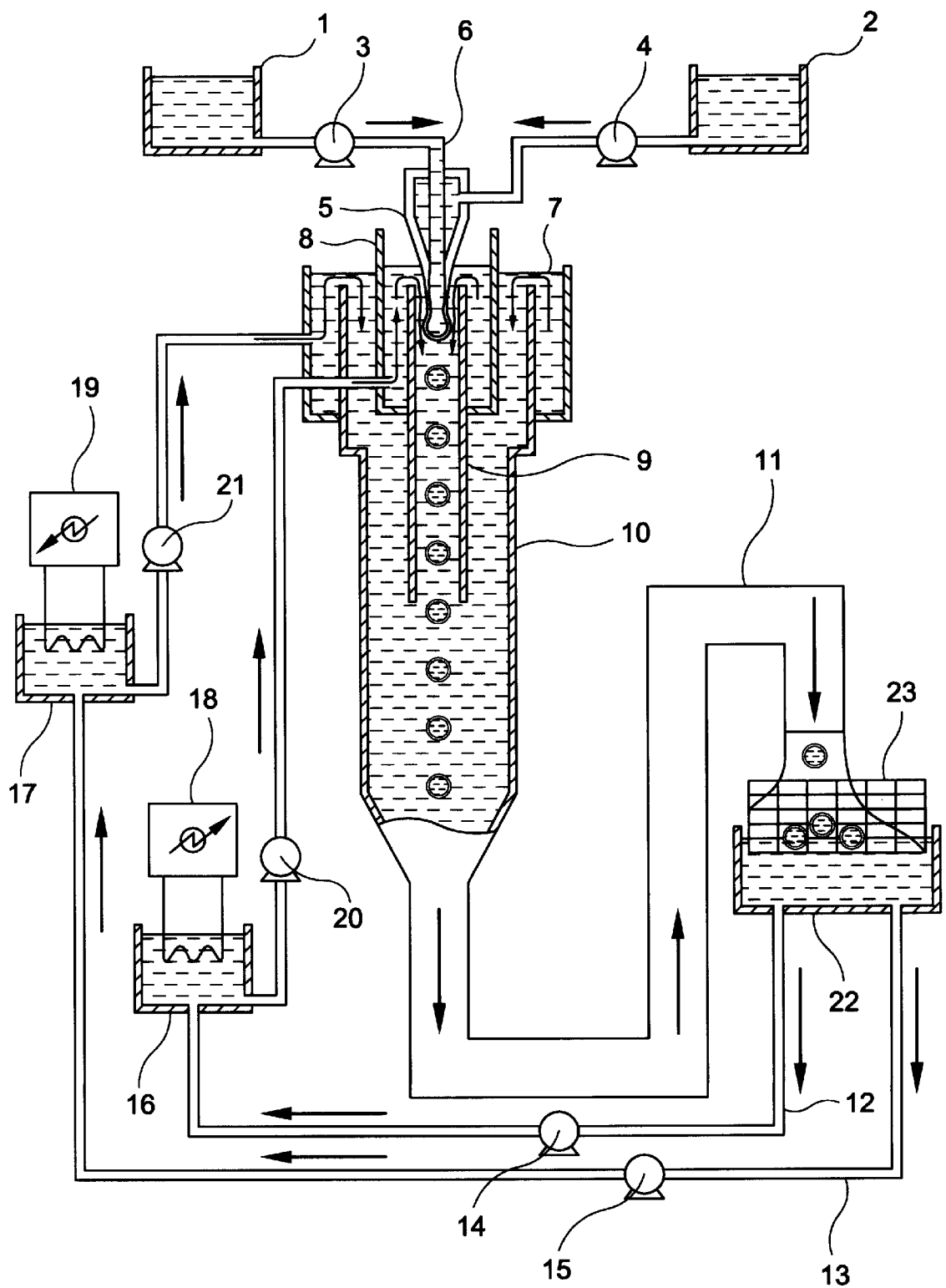
FIG. 1 illustrates a schematic sectional side view of an apparatus for making seamless capsules according to one embodiment of the present invention in which a cooling fluid is used to cool a heated carrier fluid.

The present inventors have discovered that seamless capsules can be formed by employing carbohydrates in glassy state as the shell materials. Because carbohydrates in glassy state are formed through solidification, capsule drying is not required. In addition, the carbohydrate shell materials dissolve rapidly and do not leave distasteful residues in the mouth.

Because carbohydrates solidify rapidly in a cooled medium, in the prior art method discussed above, prior to encapsulating the core material, the carbohydrate shell material already solidifies in the cooled carrier fluid. Unless otherwise indicated the term "fluid" is meant to encompass a liquid or air. As a result of this rapid cooling, seamless capsules could not be formed, and any capsules that were formed were not spherical and did not have uniform size and shape.

The present inventors have discovered a method and an apparatus for making seamless capsules that overcome the drawbacks in the prior art and are capable of forming seamless capsules that are uniform in size and shape even when carbohydrates are used as the shell materials. In addition, this method and apparatus can make seamless capsules formed of a shell material encapsulating a single center-filled core material, i.e., the core material is not distributed or dispersed within the shell material matrix.

The end use compositions in which the seamless capsules of the present invention are employed include consumable products and products applied to the human body.

The consumable products include foodstuffs, beverages, medicament compositions, chewing gums, confectionery, and dentifrice compositions. Preferably, the consumable product does not adversely affect the integrity of the seamless capsule. For example, some consumable products which have a high water activity could adversely affect the carbohydrate shell such as by rupturing the shell. For such applications damage to the shell can be avoided by adding the capsule to the product at the time of consumption. Damage may also be avoided by adding to or coating the seamless capsule with a water barrier material such as a wax, fat, water impermeable polymer and the like or combinations thereof. Such coating techniques as would be employed herein are well known to those skilled in the art and are described in, for example, "Sugar Confectionery Manufacture", E. B. Jackson, ed. 2nd Edition, 1995.

Foodstuffs include ice cream, jellies, whipped toppings, and the like.

Beverages include both non-alcoholic beverages such as carbonated sodas, tea, juices and the like as well as alcoholic beverages.

Medicament compositions include, for example, antiseptics, analgesics, antibiotics, antifungals, cough mixtures, antacids, digestive aids, decongestants and the like. Such compositions may be administered as tablets, lozenges, nose sprays, liquid formulations, capsules, geltabs, and the like.

Chewing gums include those having a soft or hard shell both containing sugar and sugar free.

Confectionery include, but are not limited to hard and soft candy compositions, chocolates, candy bars and the like.

Dentifrice compositions include, for example, toothpastes, antiplaque washes, mouthwashes, gargles, and the like.

Products produced in accordance with the present invention which are applied to the human body include toiletries, such as shaving lotions, soaps, creams and foams, colognes, deodorants, antiperspirants, bath oils, shampoos, hair treating compositions, conditioners, sunburn lotions, talcum powders, face creams, hand creams, and the like.

FIG. 1 illustrates an example of an apparatus that can be used to make a seamless capsule according to the present invention. The apparatus comprises a multiple nozzle system having an outer nozzle 5 and an inner nozzle 6, which are concentrically aligned. The inner nozzle 6 is connected to a tank 1, which supplies the core material to the inner nozzle 6 through a gear pump 3. The outer nozzle 5 is connected to a tank 2, which supplies the shell material to the outer nozzle 5 through a gear pump 4. A duct 9 is located beneath the multiple nozzle system. The upper part of the duct 9 is surrounded by a heating cylinder 8 in a concentric alignment. The heating cylinder 8 is connected to a tank 16, which is provided with a heater 18 for heating a carrier fluid that is fed through a feed pump 20 to the heating cylinder 8. The heating cylinder 8 has an overflow over the duct 9, thereby allowing the heated carrier fluid to flow from the heating cylinder 8 into the duct 9.

The lower end of the duct 9 extends into a duct 10. The upper part of the duct 10 is surrounded by a cooling cylinder 7 in a concentric alignment. The cooling cylinder 7 is connected to a tank 17, which is provided with a cooler 19 for cooling a carrier fluid. The cooled carrier fluid is fed through a feed pump 21 to the cooling cylinder 7. The cooling cylinder 7 has an overflow over the duct 10, thereby allowing the cooled carrier fluid to flow from the cooling cylinder 7 to the duct 10.

The lower end of the duct 10 forms a funnel-shape portion, which is connected to a recovery pipe 11. The recovery pipe 11 extends towards a circulating fluid tank 22 and terminates at a small distance from the top of the circulating fluid tank 22. Arranged on the circulating fluid tank 22 is a net-like separator 23 for separating capsules from the carrier fluid. The tank 22 is connected through a pipe 12, which passes through a recycle pump 14, to tank 16 for supplying the carrier fluid to be heated in tank 16. The tank 22 is also connected to a pipe 13, which passes through a recycle pump 15, for supplying the carrier fluid to be cooled in tank 17.

Figure 2:
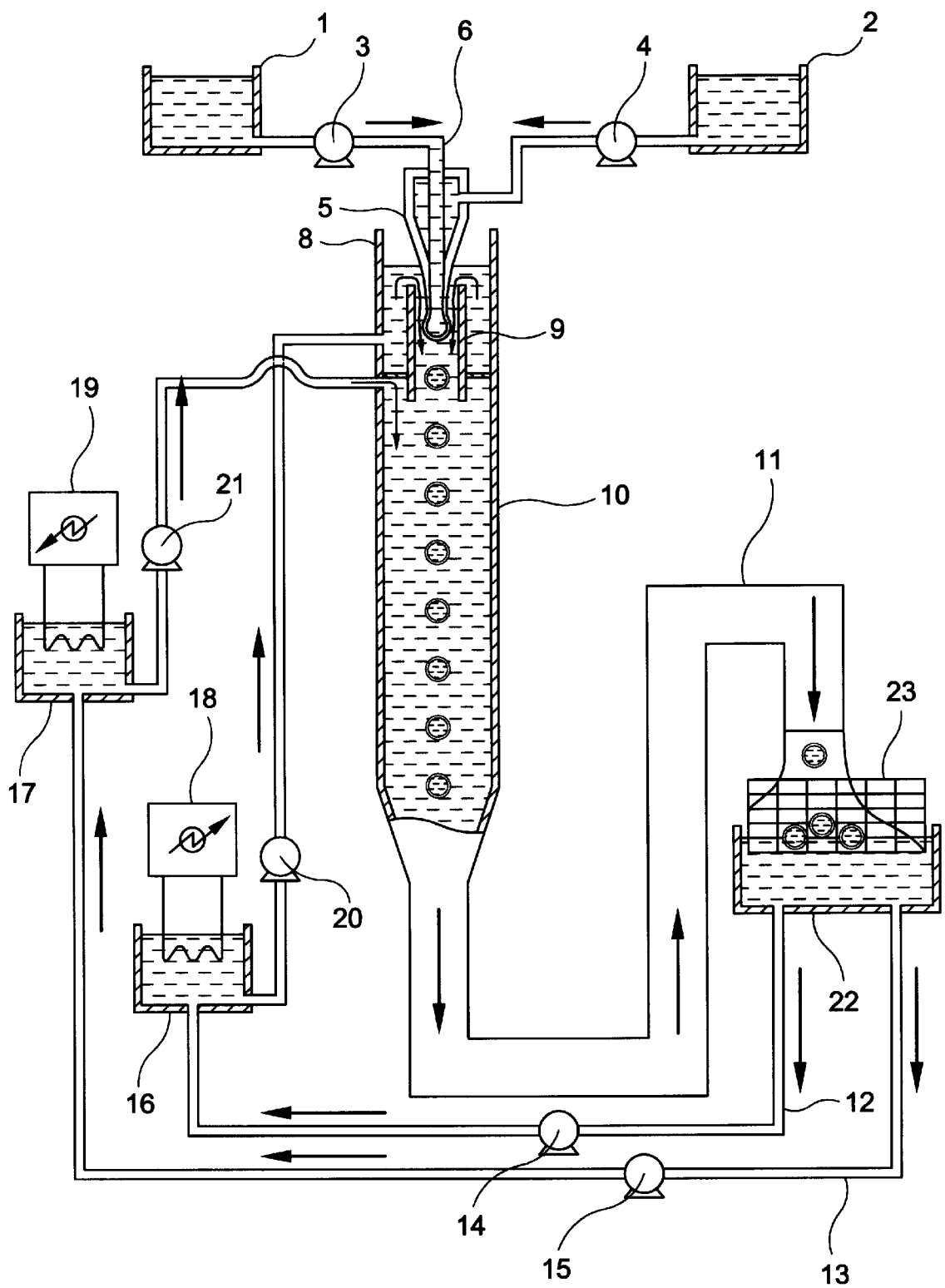
FIG. 2 illustrates a schematic sectional side view of an apparatus for making seamless capsules according to another embodiment of the present invention in which a cooling fluid is used to cool a heated carrier fluid.

FIG. 2 illustrates an alternative embodiment of an apparatus that can be used to make the seamless capsules of this invention. The apparatus in this embodiment is similar to that depicted in FIG. 1, except that the cooled carrier fluid is pumped from the tank 17 directly into a duct 10 without using a cooling cylinder provided with an overflow into duct 10.

In the embodiments of the invention shown in FIGS. 1 and 2, the heated carrier fluid which provides a suitable environment for encapsulation is cooled by direct contact with a second fluid (i.e. a cooled carrier fluid). The cooling process allows the capsules to solidify.

Figure 3:
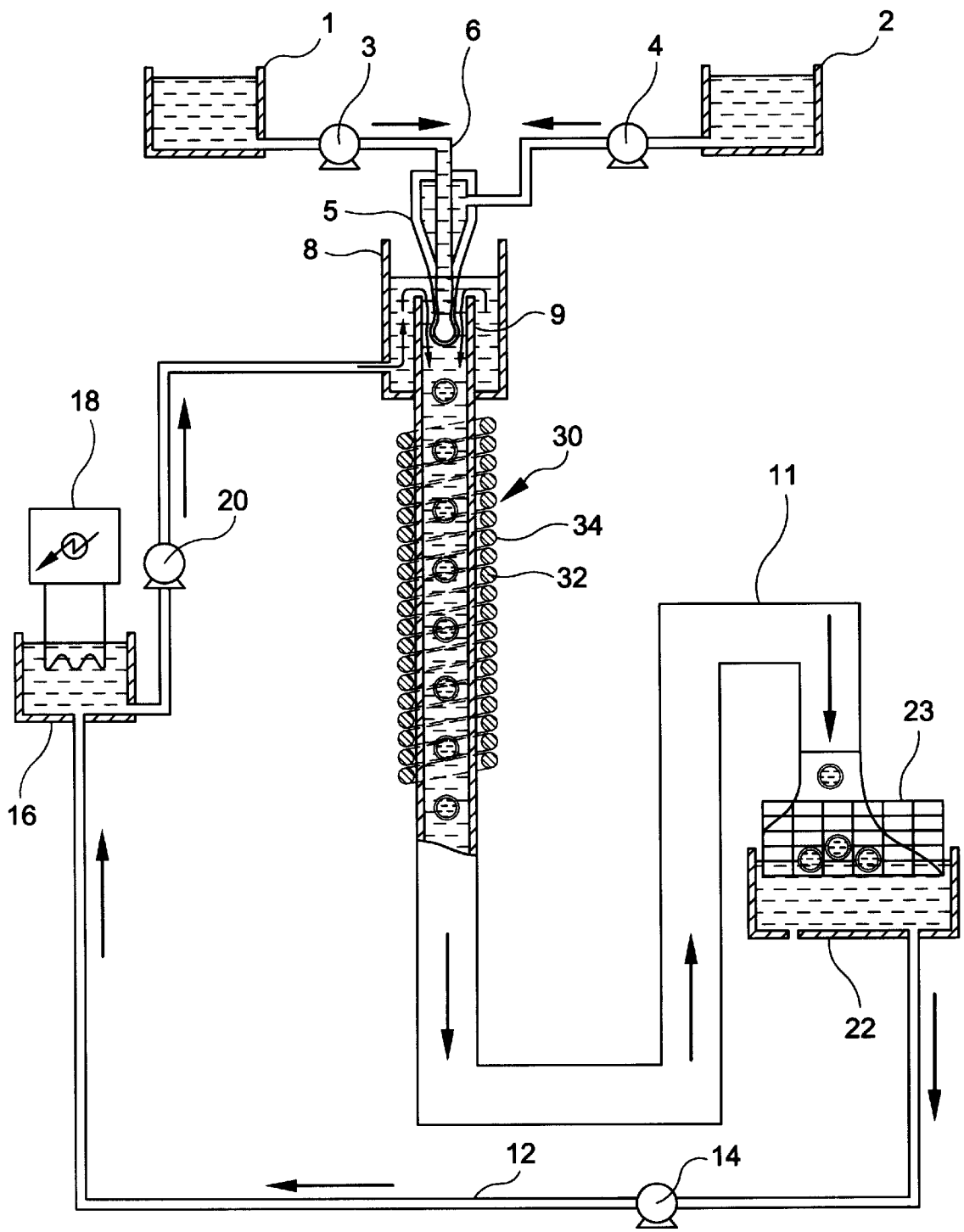
FIG. 3 illustrates a schematic sectional side view of an apparatus for making seamless capsules in which a heated carrier fluid is cooled by a heat exchange system in the absence of direct contact with a cooling fluid.

In another embodiment of the invention, the heated carrier fluid is cooled indirectly in that there is no direct contact with a cooled carrier fluid in the duct 10. Referring to FIG. 3, the cooled carrier fluid, the tank 17 storing the same, and duct 10 are eliminated. The duct 9 is extended downwardly and is connected with the recovery pipe 11 for recovering the solidified samples. There is provided a heat exchange system or a refrigeration system 30 comprised of a plurality of heat exchange or refrigeration coils 32 circumscribing at least a portion of the downwardly extended portion of the duct 9. A heat exchange fluid (e.g. a hydrofluorocarbon, propylene glycol, ethylene glycol, silicone oil and the like) is caused to pass through the coils from a source (34). The temperature of the heat exchange fluid is selected so that the heated carrier fluid is cooled to a sufficiently low temperature so that the capsules passing from the duct 9 can solidify within the downwardly extended duct 9. The warmed heat exchange fluid is then circulated to a refrigeration system for recycling in a conventional manner.

The heat exchange coils 32 may extend the entire length or only a portion of the downwardly extended length of duct 9 as shown in FIG. 3. The selection of the length of the heat exchange coils 32 and the length of duct 9 will depend on a variety of factors including the temperature of the heat exchange fluid, the volume of the heat exchange fluid employed and the like. The heat exchange fluid system 30 must be capable of reducing the temperature of the heated carrier fluid to a capsule solidification temperature (i.e. about 0° to 50° C.). For example, the temperature of the heat exchange fluid introduced to the coils 32 can be within the range of from about −40° to 0° C.

The downwardly extended portion of duct 9 is shown in FIG. 3 as having a uniform diameter along the extended length. In practice, duct 9 may likewise have a variable diameter. For example, the diameter of the downwardly extended portion of duct 9 may be increased to that of the heating cylinder 8 surrounding the upper portion of duct 9. FIG. 3 is intended to cover such variations.

In operation, a heated carrier fluid is sent from the tank 16 to the heating cylinder 8 where formation of the capsules takes place. The capsules and heated carrier fluid are sent downwardly through the duct 9 where the carrier fluid is cooled by the refrigeration system 30 to thereby solidify the capsules which then travel through the recovery pipe 11 to the separator 23.

Figure 4:
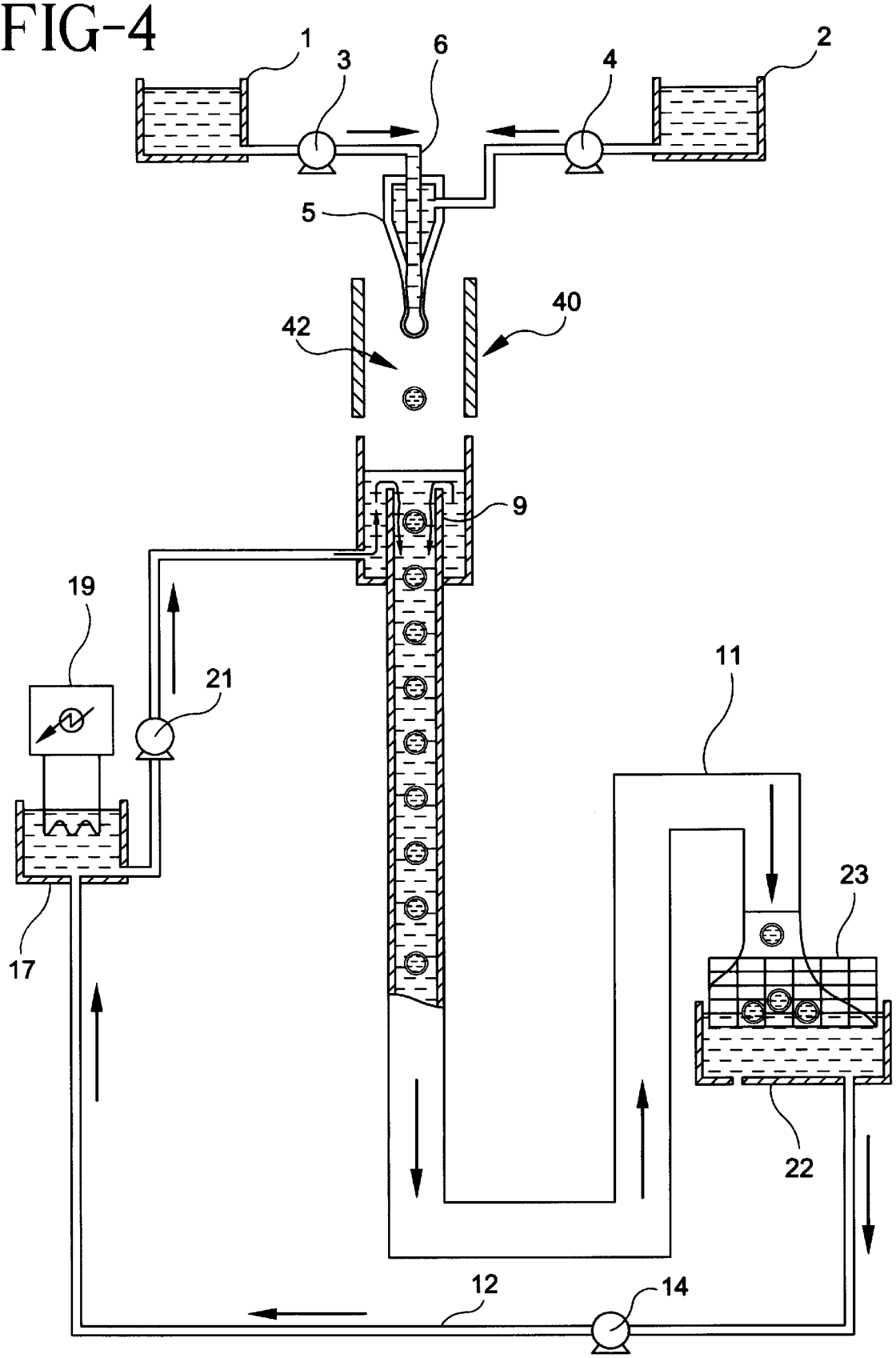
FIG. 4 illustrates a schematic sectional view of a still further embodiment of the invention in which the capsules are formed in a heated gas.

As previously indicated, the capsules can be formed in a gas as well as a liquid. For example, the capsules can be formed in air which has been heated to a temperature sufficient to form the capsules. Referring to FIG. 4, there is shown an embodiment of the invention in which the capsule materials are ejected from the nozzles 5,6 into a heater 40 having a space 42 containing air or other suitable gaseous medium. The heater 40 heats the air to a temperature sufficient to form capsules from the capsule forming materials. The capsules move into the duct 9 where a cooling fluid from the tank 17 is supplied. The capsules solidify in the duct 9 before being recovered in the separator 23 via the recovery pipe 11.

The process of making the seamless capsules will now be described in detail. The shell material is supplied from tank 2 into the outer nozzle 5 and the core material is supplied from the tank 1 into inner nozzle 6. The core material and the shell material are then simultaneously extruded to form a coaxial jet with the shell material surrounding the core material. The carrier fluid in tank 16 (See FIGS. 1–3) is heated to a temperature that is close to or higher than the temperature of the shell material and is supplied to duct 9. Typically, the temperature of the heated carrier fluid is from about 90° to 160° C. The coaxial jet is introduced to the duct 9 containing the heated carrier fluid flowing downwardly. Because the heated carrier fluid is at a temperature that is close to or higher than the temperature of the shell material in the coaxial jet, it prevents the shell material from solidifying, thereby allowing the shell material to encapsulate the core material to form capsules.

The carrier fluid in tank 17 is cooled to a temperature low enough to allow the capsules to solidify. Preferably, the carrier fluid is cooled to a temperature of from about −20° to 30° C. The cooled carrier fluid is supplied from tank 17 to duct 10 as shown in FIGS. 1 and 2 or to duct 9 as shown in FIG. 4. The capsules from duct 9 are then carried by the heated carrier fluid into duct 10 (FIGS. 1 and 2) containing the cooled carrier fluid that is flowing downwardly. The final temperature of the combined streams is low enough so that the capsules are then cooled sufficiently to allow them to solidify in duct 10 to form the seamless capsules. The thus-formed seamless capsules are then transported through pipe 11 toward separator 23 located in tank 22. The separator 23 separates the seamless capsules from the carrier fluid to collect the seamless capsules. The separated carrier fluid flows into tank 22 and is then recycled to tanks 16 and 17 through pipes 12 and 13, respectively.

In the embodiment of the invention shown in FIG. 3, the carrier fluid is heated to a temperature of 90° to 160° C. and the coaxial jet is introduced to the duct 9 containing the downwardly flowing heated carrier fluid. As the carrier fluid flows through the downwardly extended duct 9, it is cooled by the heat exchange system 30 and particularly the coils 32 containing the heat exchange fluid therein.

In an alternative embodiment, the coaxial jet simultaneously extruded from the multiple nozzles is introduced into heated air (see FIG. 4) instead of a flow of the heated carrier fluid. As the coaxial jet descends through air for a sufficient distance, it breaks down into droplets, thereby allowing the shell material to encapsulate the core material to form capsules. Typically, the distance that the coaxial jet travels through air is from about 3 to 15 cm. The capsules then descend into a flow of cooled carrier fluid to allow the capsules to solidify. The temperature of the air should be higher than that of the cooled carrier fluid and should be maintained within a range in which the shell material does not solidify within the traveled distance. The air temperature may be maintained at ambient temperature, i.e., from about 25° to 35° C., or in another embodiment, the air can be heated above ambient, at a preselected set point, for example, by the use of a tubular heater which maintains the air within at the preselected temperature.

Any fluid that does not dissolve the shell material and can be heated and cooled to the appropriate temperatures without undergoing phase change can be used as the carrier fluid in the present invention. Examples of suitable carrier fluids include medium chain triglyceride (MCT) oil, corn oil, cottonseed oil, canola (rapeseed) oil, sunflower oil, silicone oils, mineral oils and the like.

Preferably, the shell material and the core material are simultaneously extruded by setting the fluid volumetric flux of the shell material through the outer nozzle equal to the fluid volumetric flux of the core material through the inner nozzle. The fluid volumetric flux of a material flowing from a nozzle orifice is defined as the ratio of the volumetric flow rate of the material through the nozzle to the nozzle orifice area. As described by co-pending application Ser. No. 08/325,722, filed Oct. 7, 1994 (Attorney Docket No. PD-4872), the disclosure of which is hereby incorporated herein by reference, by setting the fluid volumetric flux of the shell material equal to that of the core material through the concentrically aligned nozzles, the mass ratio of the core material to the shell material in the capsule can be controlled by merely varying the size of the orifice areas of the nozzles.

The concentrically aligned multiple nozzle system that can be used in the present invention can have more than two concentrically aligned inner and outer nozzles. There can be one or more concentrically aligned intermediate nozzles positioned between the inner and outer nozzles, from which one or more intermediate shell materials can be extruded. In such an embodiment, the shell material extruded from the outer nozzle encapsulates the intermediate shell material extruded from the intermediate nozzle, which in turn encapsulates the core material from the inner nozzle. In a preferred embodiment of this invention, the fluid volumetric flux of the intermediate shell material through the intermediate nozzle will be set to be equal to the fluid volumetric flux of shell material through the outer nozzle and the fluid volumetric flux of the core material through the inner nozzle.

Examples of suitable carbohydrates that can be used as the shell material in the present invention include sucrose, glucose, fructose, isomalt, hydrogenated starch hydrolysate, maltitol, lactitol, xylitol, sorbitol, erythritol, mannitol, and the like, and mixtures thereof. Typically, the carbohydrate is fed into the outer nozzle as the shell material in the form of a melt. When the carbohydrate solidifies in the cooled carrier fluid, it turns into a glassy state, i.e., amorphous state. When the carbohydrate is in a glassy state, it exhibits an enhanced ability to protect the center-filled core material from vaporization and deterioration.

Suitable core materials are those which can be incorporated into the various products for consumption and topical application previously described. Core materials are typically in liquid form or meltable solid materials. Examples of suitable core materials include MCT oils, (e.g., such as coconut oil,), peppermint oil, cinnamon oil, fennel oil, clove oil, wheat-canola (rapeseed) oil, sunflower oil, soybean oil, cottonseed oil and the like), silicone oils, mineral oils, fruit flavors, vitamins, pharmaceutical solutions, natural and artificial sweeteners, menthol, and the like.

Any material that is liquid at the operating temperature and does not dissolve the core or shell materials and further solidifies during the cooling process may be used as an intermediate shell material. Examples of suitable intermediate shell materials include waxes (e.g., paraffin wax, microcrystalline wax, polyethylene wax, carnauba wax, candellila wax and the like) and fats (e.g., hydrogenated fats such as those known to persons of skill in the art).

The following examples are illustrative of embodiments of the invention and are not intended to limit the invention as encompassed by the claims forming part of the Application.

EXAMPLE 1

Seamless capsules were prepared by using a concentrically aligned multiple nozzle system having an inner nozzle and an outer nozzle. The inner nozzle had an inside diameter of 0.20 cm, and outside diameter of 0.26 cm, and an orifice area of 0.0314 $cm^2$. The outer nozzle had an inside diameter of 0.39 cm and an annular orifice area of 0.0664 $cm^2$. A mixture of 90 wt. % isomalt and 10 wt. % xylitol was melted at a temperature of 155° C. and maintained in a tank at 148° C. This mixture had an actual viscosity of 628 cps at 140° C. Generally, the methods of the present invention would involve the use of shell materials having an actual viscosity of less than about 1,000 cps at the operating temperature. The resultant mixture had a density of 1 g/ml. The mixture was then fed to the outer nozzle as the shell material at a temperature of 145° C. and a volumetric flow rate of 2.37 ml/min. A mixture of 10 wt % cherry flavor and 90 wt. % cotton seed oil having a density of 0.96 g/ml was supplied to the inner nozzle as the core material at ambient temperature and a volumetric flow rate of 5.01 ml/min. The shell material and the core material were then simultaneously extruded from the outer and inner nozzles, respectively, at the same fluid volumetric flux of 75.5 ml/min. $cm^2$ into air, which was maintained at 200° C. The coaxial jet descended through air for 10 cm and broke down into droplets to allow encapsulation to take place. The capsules then descended into coconut oil cooled to a temperature of 20° C. and flowing downward at a rate of 1,000 ml/min. The resultant capsules collected had a diameter of about 4 mm and contained 68.78 wt. % of the shell material in a glassy state and 31.22 wt. % of the core material.

EXAMPLES 2–6

Five seamless flavor bead compositions each having an oil based center can be prepared in accordance with Example 1. Each of the compositions has an outer shell comprising 70% by weight and an inner core comprised of 30% by weight based on the total weight of the flavor bead composition.

The components comprising each of the flavor bead compositions are shown in Table 1.

TABLE 1

|  | 2 | 3 | 4 | 5 | 6 |
|---|---|---|---|---|---|
| Shell(70%) | | | | | |
| Isomalt | 62.8153 | 62.8153 | 62.8153 | 62.8153 | 62.8153 |
| Xylitol | 6.9800 | 6.9800 | 6.9800 | 6.9800 | 6.9800 |
| Acesulfame-K | 0.1540 | 0.1540 | 0.1540 | 0.1540 | 0.1540 |
| Ethyl Vanillin | 0.0007 | 0.0007 | 0.0007 | 0.0007 | 0.0007 |
| FD & C Blue#2 | 0.0500 | 0.0000 | 0.0000 | 0.0000 | 0.0000 |
| FD & C Red#40 | 0.0000 | 0.0000 | 0.0000 | 0.2100 | 0.2100 |
| Core(30%) | | | | | |
| Wesson Oil#77 | 25.4100 | 25.4100 | 25.4100 | 25.4100 | 25.4100 |
| Star Anis Oil | 0.0900 | 0.0900 | 0.0900 | 0.0900 | 0.0900 |
| Peppermint Oil | 4.5000 | 0.0000 | 0.0000 | 0.0000 | 0.0000 |
| Tropical Punch | 0.0000 | 6.0000 | 0.0000 | 0.0000 | 0.0000 |

TABLE 1-continued

|  | 2 | 3 | 4 | 5 | 6 |
|---|---|---|---|---|---|
| Grapefruit Oil | 0.0000 | 0.0000 | 6.0000 | 0.0000 | 0.0000 |
| Cherry Oil | 0.0000 | 0.0000 | 0.0000 | 6.0000 | 0.0000 |
| Cinnamon Oil | 0.0000 | 0.0000 | 0.0000 | 0.0000 | 6.0000 |
| Total | 100.0000 | 100.0000 | 100.0000 | 100.0000 | 100.0000 |

Each of the samples shown in Table 1 exhibited uniform size and shape seamless capsules which rapidly dissolve in the mouth and do not leave an undesirable aftertaste.

EXAMPLE 7

Seamless capsules are prepared as in Example 1. The shell material and core material are simultaneously extruded from the outer and inner nozzles, respectively, into a hot carrier fluid to enable encapsulation to take place. The capsules descend in the duct 9 which is surrounded by coils containing a heat exchange fluid such as propylene glycol which is cooled to a temperature of about −40° C. As the encapsulated material descends it will cool to a maximum temperature of no more than 50° C. to solidify the capsules.

The diameter of the duct 9 could be from about 0.5 to 2.0" with a length of from about 15 to 20 feet. The refrigeration system would contain coils having a diameter of from 0.25 to 0.50" to carry sufficient heat exchange fluid to lower the temperature of the carrier fluid to a desired temperature.

What is claimed is:

1. A method for making a seamless capsule comprising a shell material encapsulating a center-filled core material comprising the steps of:

providing a concentrically aligned multiple nozzle system having at least an outer nozzle and in inner nozzle;

supplying a shell material to the outer nozzle and a core material to the inner nozzle;

simultaneously extruding the shell material through the outer nozzle and the core material through the inner nozzle, thereby forming a coaxial jet of the shell material surrounding the core material;

introducing the coaxial jet into a flow of a heated carrier fluid, thereby allowing the shell material to encapsulate the core material to form capsules in the heated carrier fluid;

cooling the heated carrier fluid by a heat exchanger assembly to form a cooled carrier fluid to thereby allow the capsules to solidify.

2. The method according to claim 1 comprising cooling the heated carrier fluid to a sufficiently low temperature to thereby allow the capsules to solidify.

3. The method according to claim 1 comprising passing a heat exchange fluid through the heat exchange system in heat exchange relationship with the heated carrier fluid to thereby form the cooled carrier fluid.

4. The method according to claim 3 further comprising passing the heat exchange fluid through at least one coil circumscribing at least a portion of the length of the duct.

5. The method according to claim 1 comprising cooling the heated carrier fluid to a temperature of from about 0° to 50° C.

6. The method according to claim 1, wherein a carbohydrate in a melted state is supplied to the outer nozzle.

7. The method according to claim 6, wherein when the capsules solidify, the carbohydrate is in a glassy state.

8. The method according to claim 1, wherein the core material is medium chain triglyceride oil.

9. The method according to claim 1, wherein the shell material and the core material are simultaneously extruded by setting the fluid volumetric flux of the shell material through the outer nozzle equal to the fluid volumetric flux of the core material through the inner nozzle.

10. The method according to claim 1, further comprising the step of supplying at least one intermediate shell material through at least one intermediate nozzle positioned between the inner and outer nozzles in the concentrically aligned multiple nozzle system.

11. The method according to claim 10, wherein the shell material, the intermediate shell material and the core material are simultaneously extruded by setting the fluid volumetric flux of the shell material through the outer nozzle, the fluid volumetric flux of the intermediate shell material through the intermediate nozzle, and the fluid volumetric flux of the core material through the inner nozzle equal.

12. The method of claim 1 comprising introducing the coaxial jet into a duct and cooling the heated carrier fluid within said duct.

13. A method for making a seamless capsule comprising a shell material encapsulating a center-filled core material comprising the steps of:

providing a concentrically aligned multiple nozzle system having at least an outer nozzle and in inner nozzle;

supplying a shell material to the outer nozzle and a core material to the inner nozzle;

simultaneously extruding the shell material through the outer nozzle and the core material through the inner nozzle, thereby forming a coaxial jet of the shell material surrounding the core material;

introducing the coaxial jet into a duct containing a flow of a heated air, thereby allowing the shell material to encapsulate the core material to form capsules in the heated air;

introducing the capsules into a second duct containing a cooled carrier fluid to thereby allow the capsules to solidify.

14. The method of claim 13 comprising supplying the cooled carrier fluid into a reservoir, adding a sufficient amount of cooled carrier fluid to the reservoir so that a portion of the cooled carrier fluid over flows the reservoir and enters into the second duct.

15. Apparatus for making a seamless capsule comprising a shell material encapsulating a center-filled core material comprising:

a concentrically aligned multiple nozzle system having at least an outer nozzle and an inner nozzle for simultaneously extruding a shell material through the outer nozzle and a core material through an inner nozzle, thereby forming a coaxial jet of the shell material surrounding the core material;

means for supplying the shell material to the outer nozzle and the core material to the inner nozzle;

a duct located beneath the multiple nozzle system for receiving the coaxial jet;

means for delivering a heated carrier fluid to the duct to form a flow of the heated carrier fluid surrounding the coaxial jet, thereby allowing the shell material to encapsulate the core material to form capsules in the heated carrier fluid; and heat exchange means positioned about at least a portion of the duct for cooling the heated carrier fluid to thereby allow the capsules to solidify.

16. The apparatus according to claim 15, wherein the heat exchange means comprises at least one coil extending along at least a portion of said duct and means for passing a heat exchange fluid through at least one said coils in heat exchange relationship with said heated carrier fluid.

17. The apparatus according to claim 15, wherein an upper part of the duct is surrounded by a heating cylinder in a concentric alignment.

18. The apparatus according to claim 17, wherein the heating cylinder has an overflow over the top of the first duct.

19. The apparatus according to claim 15, wherein the duct is connected to a recovery pipe.

20. The apparatus according to claim 15, wherein said multiple nozzle system further comprises at least one intermediate nozzle positioned between the inner and outer nozzles.

21. Apparatus for making a seamless capsule comprising a shell material encapsulating a center-filled core material comprising:

a concentrically aligned multiple nozzle system having at least an outer nozzle and an inner nozzle for simultaneously extruding a shell material through the outer nozzle and a core material through an inner nozzle, thereby forming a coaxial jet of the shell material surrounding the core material;

means for supplying the shell material to the outer nozzle and the core material to the inner nozzle;

treating means for receiving the coaxial jet; and heating means comprising means for heating the coaxial jet with a heated gas to thereby allow the shell material to encapsulate the core material to form capsules; and cooling means for receiving the capsules and for cooling the capsules to thereby allow the capsules to solidify.

22. A seamless capsule having an outer shell made of a carbohydrate in a glassy state produced by the method of claim 1.

23. A seamless capsule having an outer shell made of a carbohydrate in a glassy state produced by the method of claim 13.

* * * * *